United States Patent
Ijima et al.

(10) Patent No.: US 6,510,121 B2
(45) Date of Patent: Jan. 21, 2003

(54) OBJECTIVE LENS DRIVING DEVICE INCLUDING A DAMPING MEMBER WHICH HAS AN OPENING ON A MAIN SURFACE TO ALLOW AN OPTICAL AXIS OF A LENS TO PASS THROUGH, AND OPTICAL PICKUP USING THE OBJECT LENS DRIVING DEVICE

(75) Inventors: Shinichi Ijima, Takatsuki (JP); Kazuhiko Yamanaka, Takatsuki (JP); Kazutoshi Onozawa, Takatsuki (JP); Hideyuki Nakanishi, Otsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/821,670

(22) Filed: Mar. 29, 2001

(65) Prior Publication Data

US 2001/0028624 A1 Oct. 11, 2001

(30) Foreign Application Priority Data

Mar. 29, 2000 (JP) ........................................ 2000-092384

(51) Int. Cl.7 ................................................. G11B 7/09

(52) U.S. Cl. .................... 369/247; 369/112.23; 359/813
(58) Field of Search ........................... 369/112.23, 248, 369/247; 359/814

(56) References Cited

U.S. PATENT DOCUMENTS

| 5,640,280 | A | * | 6/1997 | Lee .............................. 359/824 |
| 5,892,629 | A | * | 4/1999 | Nishihara et al. ........... 359/814 |
| 5,999,341 | A | * | 12/1999 | Haruguchi et al. .......... 359/811 |
| 6,246,532 | B1 | * | 6/2001 | Hori ............................ 359/813 |
| 6,330,120 | B1 | * | 12/2001 | Shibusaks et al. .......... 359/814 |

* cited by examiner

Primary Examiner—Aristotelis M. Psitos (57) ABSTRACT

In a lens driving device for an optical recording/reproducing apparatus, a lens is held by a platelike damping member that is made of silicone porous material, for example, and both ends of the damping member are fixed to a base. This construction prevents undesired oscillations. Also, in order to drive the lens, two magnets are attached to an outer edge of the lens opposite to each other with the lens interposed in between them, and driving coils are attached to the base facing the magnets. The driving coils have two coils that drive the lens in the tracking and focusing directions, respectively.

9 Claims, 7 Drawing Sheets

OBJECTIVE LENS DRIVING DEVICE INCLUDING A DAMPING MEMBER WHICH HAS AN OPENING ON A MAIN SURFACE TO ALLOW AN OPTICAL AXIS OF A LENS TO PASS THROUGH, AND OPTICAL PICKUP USING THE OBJECT LENS DRIVING DEVICE

BACKGROUND OF THE INVENTION (1) Field of the Invention

The present invention relates to a lens driving devise used in an optical recording/reproducing apparatus for a recording medium such as a compact disc (CD) and a DVD, and an optical pickup equipped with such a lens driving device.

(2) Prior Art

In recent years, optical recording/reproducing apparatuses for compact mass recording media, such as CDs and DVDs, have become widely used for recording pictures, sounds, and other information.

An optical recording/reproducing apparatus reads information by irradiating the recording surface of a recording medium such as an optical disc with a laser beam using a lens and observing the light reflected from the recording surface. The information is recorded along a spiral track on the recording surface.

Here, when the recording medium distorts or deforms, or when a turntable on which the recording medium is mounted tilts or precesses, the distance between the recording surface and the lens changes and the laser beam fails to focus on the recording surface. Also, when the recording medium or the turntable is decentered, the track is displaced in the direction of the radius of the medium and departs from an optical path of the laser beam.

In order to prevent read errors caused by these factors, the lens is moved up and down in the direction of its optical axis (hereafter called "focusing direction") to focus the laser beam on the recording surface. Also, the lens is moved in the direction of the radius of the medium (hereafter called "tracking direction") to position the optical path of the laser beam on the track.

To move the lens in such ways, the lens is usually mounted on a movable member, and a driving unit moves the movable member to adjust the focal point and the optical path of the laser beam. Also, the recording medium is rotated at high speed (200–500 rpm in a CD, 1,000 rpm or higher in a DVD) in the optical recording/reproducing apparatus, so that the lens has to be quickly moved to the target position. However, natural oscillations of the lens driving device or the optical pickup itself cause instability in the control system.

To suppress the oscillations, Japanese Laid-Open Patent Application No. H7-105551 discloses a lens driving device in which a movable member including a lens is held like a cantilever by a fixed member via a linear elastic supporting member, and a viscoelastic damping member is positioned on the side of the fixed member surrounding the root of the elastic supporting member. With this construction, the oscillations of the elastic supporting member are absorbed by the damping member, and as a result, the oscillations of the lens are suppressed.

However, the damping member in the lens driving device described above is not effective enough to suppress the substantial oscillations of the elastic supporting member, due to the following reason. In the oscillations which have the length of the supporting member as a fundamental wavelength, higher order components are lower in amplitude than lower order components, so that the higher order components are difficult for the damping member to absorb.

Also, because of the construction of the lens driving device in which the movable member including the lens is held like a cantilever by the fixed part via the elastic supporting member, the size of the lens driving device tends to be large in the longitudinal direction of the elastic supporting member.

SUMMARY OF THE INVENTION

The first object of the present invention is to provide a lens driving device constructed rationally for an optical recording/reproducing apparatus. The second object of the present invention is to provide a lens driving device that effectively suppresses higher order oscillations. The third object of the present invention is to provide a lens driving device that is compact enough to be used for a reproducing apparatus for recording media such as DVDs. These objects are achieved by a lens driving device that consists of a lens, a base, a damping member that is made of a material which is viscoelastic and holds the lens in the state of being movable in relation to the base, and a driving means for driving the lens in a given direction.

A material which is viscoelastic can suppress oscillations through its vibration absorbency. When a lens is held by a supporting member made of such a material, oscillations of the lens are suppressed regardless of the direction of the oscillations, and the size of the lens driving device become smaller.

In addition, the second object of the present invention is to provide an optical pickup equipped with the lens driving device descried above. The object can be achieved by an optical pickup that consists of a semiconductor laser component, a lens for condensing a laser beam emitted from the semiconductor laser component on a recording surface of an optical recording medium, photoreceptors that receive a returning laser beam from the optical recording medium, an enclosure that holds the lens and contains the semiconductor laser component and photoreceptors arranged in a state of having a predetermined positional relationship, a base, a damping member that is made of a material which is viscoelastic in any direction and holds the enclosure in the state of being movable in relation to the base, and a driving means for driving the enclosure in a given direction.

BRIEF DESCRIPTION OF THE DRAWINGS

These and the other objects, advantages and features of the invention will become apparent from the following description thereof taken in conjunction with the accompanying drawings which illustrate specific embodiments of the invention.

In the drawings.

DESCRIPTION OF THE PREFERRED EMBODIMENTS

The following describes preferred embodiments of a lens driving device and an optical pickup of the present invention, with reference to drawings.

First Embodiment

Figure 1:
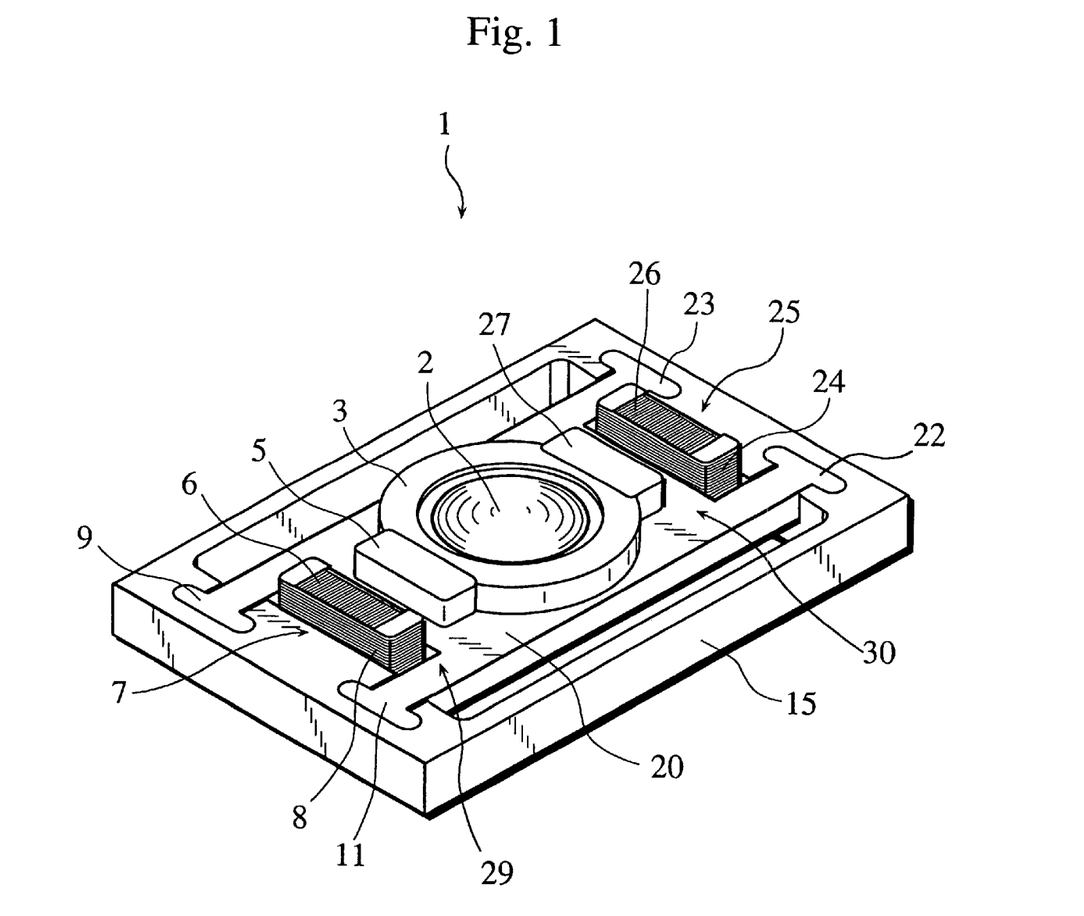
FIG. 1 is a perspective side view showing a construction of a lens driving device in the first embodiment of the present invention.

FIG. 1 is a perspective side view showing an external construction of a lens driving device 1 in the first embodiment of the present invention.

As shown in drawing, the lens driving device 1 holds a lens 2 on a framelike-shaped base 15 via a damping member 20. The lens driving device 1 moves the lens 2 in the tracking and focusing directions using two driving units 29 and 30. Here, the driving unit 29 is made up of a magnet 5 and a driving coil 7, and the driving unit 30 is made up of a magnet 27 and a driving coil 25.

Figure 2:
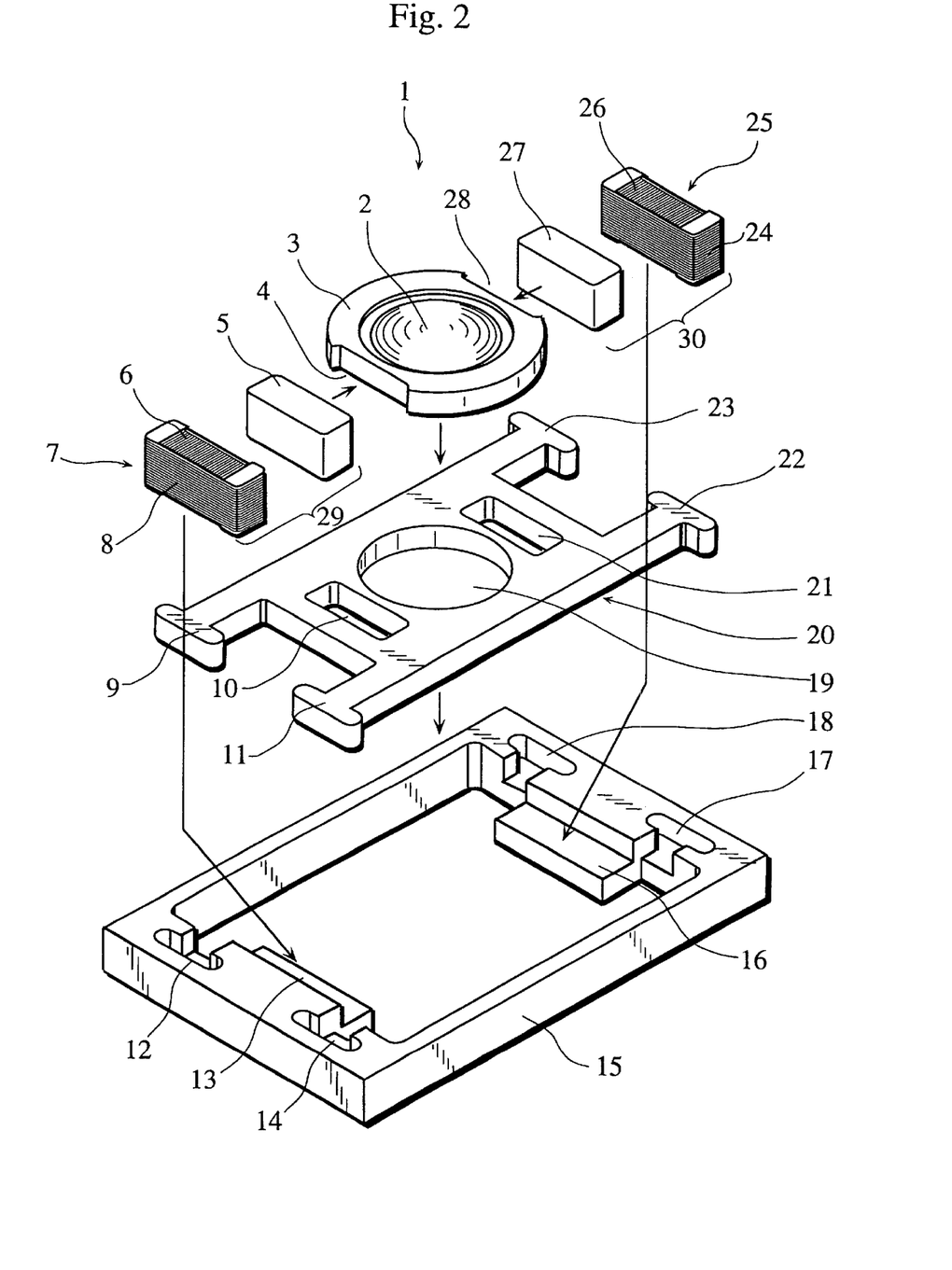
FIG. 2 shows an assembly of the lens driving device in the first embodiment.

FIG. 2 shows an assembly of the lens driving device 1.

The lens 2 is formed by molding resin. An outer edge 3 of the lens 2 has a pair of notches 4 and 28 opposite to each other. The substantially rectangular prism magnet 5 is attached in the notch 4, and the substantially rectangular prism magnet 27 is attached in the notch 28. The magnets 5 and 27 are held with their magnetic poles pointing in given directions.

The damping member 20 is platelike and made of silicone porous material (silicone is a generic name for semiorganic polymers in which each molecule is a chain composed of alternate silicon and oxygen atoms with an organic group, such as a methyl group, attached to the silicon atom), and its main surface is shaped like a letter H. An opening 19, whose caliber is similar to the aperture of the lens 2, is provided at the center of the main surface. The lens 2 is positioned so that its optical axis intersects the main surface of the damping member 20 at approximately right angles (90 degrees) and passes through the opening 19. The outer edge 3 of the lens 2 is fixed to the damping member 20 with an adhesive or the like. Also, slots 10 and 21 are arranged in the longitudinal direction of the damping member 20 with the opening 19 interposed in between them. The magnet 5 is inserted into the slot 10, and the magnet 27 is inserted into the slot 21.

Substantially T-shaped protrusions 9, 11, 22, and 23 formed at both ends of the damping member 20 to play a role like a tenon are fit into insertion holes 12, 14, 17, and 18 formed on the base 15 to play a role like a mortise, respectively. In this way, the damping member 20 is secured to the base 15. Also, step member 13 is formed between the insertion holes 12 and 14 in an inner edge of the base 15, and a step member 16 is formed between the insertion holes 17 and 18 in an inner edge of the base 15. A driving coil 7 is positioned on the step member 13 so as to face the magnet 5, and a driving coil 25 is positioned on the step member 16 so as to face the magnet 27.

The driving coil 7 is roughly made up of a focusing coil 8 and a tracking coil 6. The focusing coil 8 and the tracking coil 6 are wound around one and the same rectangular prism core in the directions that intersect each other at approximately right angles (90 degrees). In the same way, the driving coil 25 is roughly made up of a focusing coil 24 and a tracking coil 26 wound in the directions that intersect each other at approximately right angles (90 degrees). When the focusing coil 8 and 24 are excited, magnetic forces are generated between the focusing coil 8 and the magnet 5 and between the focusing coil 24 and the magnet 27. By these magnetic forces, the lens 2 is moved in the focusing direction. Also, when the tracking coils 6 and 26 are excited, magnetic forces are generated between the tracking coil 6 and the magnet 5 and between the tracking coil 26 and the magnet 27. As a result of which, the lens 2 is moved in the tracking direction.

The damping member 20 is made of a gel material. Specifically, the gel material is a silicone porous material that is formed by filling a mixture of liquid silicone and a bridging agent in a metal-mold and then heating it. Elastic capsules of 50-$\mu$m-diameter filled with air are mixed into the mixture beforehand and give porosity to the damping member 20.

The base 15 is formed by molding alloy of aluminum.

Figure 3:
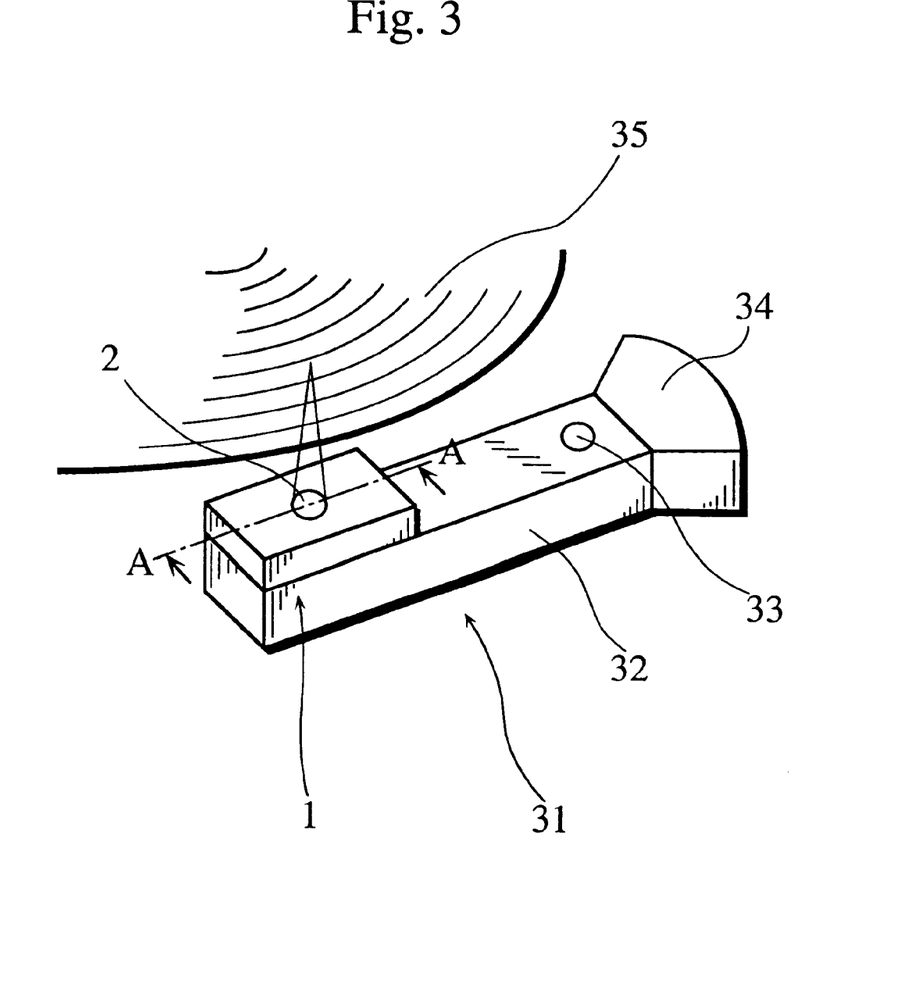
FIG. 3 is a perspective side view showing a construction of an optical pickup equipped with the lens driving device of the first embodiment.

FIG. 3 is a perspective side view showing an example optical pickup equipped with the lens driving device 1. An optical pickup 31 shown in the drawing uses a swinging arm method. The lens driving device 1 is attached to one end of a swinging arm 32 on the side of an optical disc 35. A counterbalancing member 34 is attached to the other end of the swinging arm 32. The swinging arm 32 is balanced on a pivot 33. The swinging arm 32 is rotated on the pivot 33 in a plane parallel to the optical disc 35 by a rotation driving mechanism (not illustrated) so as to trace the track of the optical disc 35.

Figure 4:
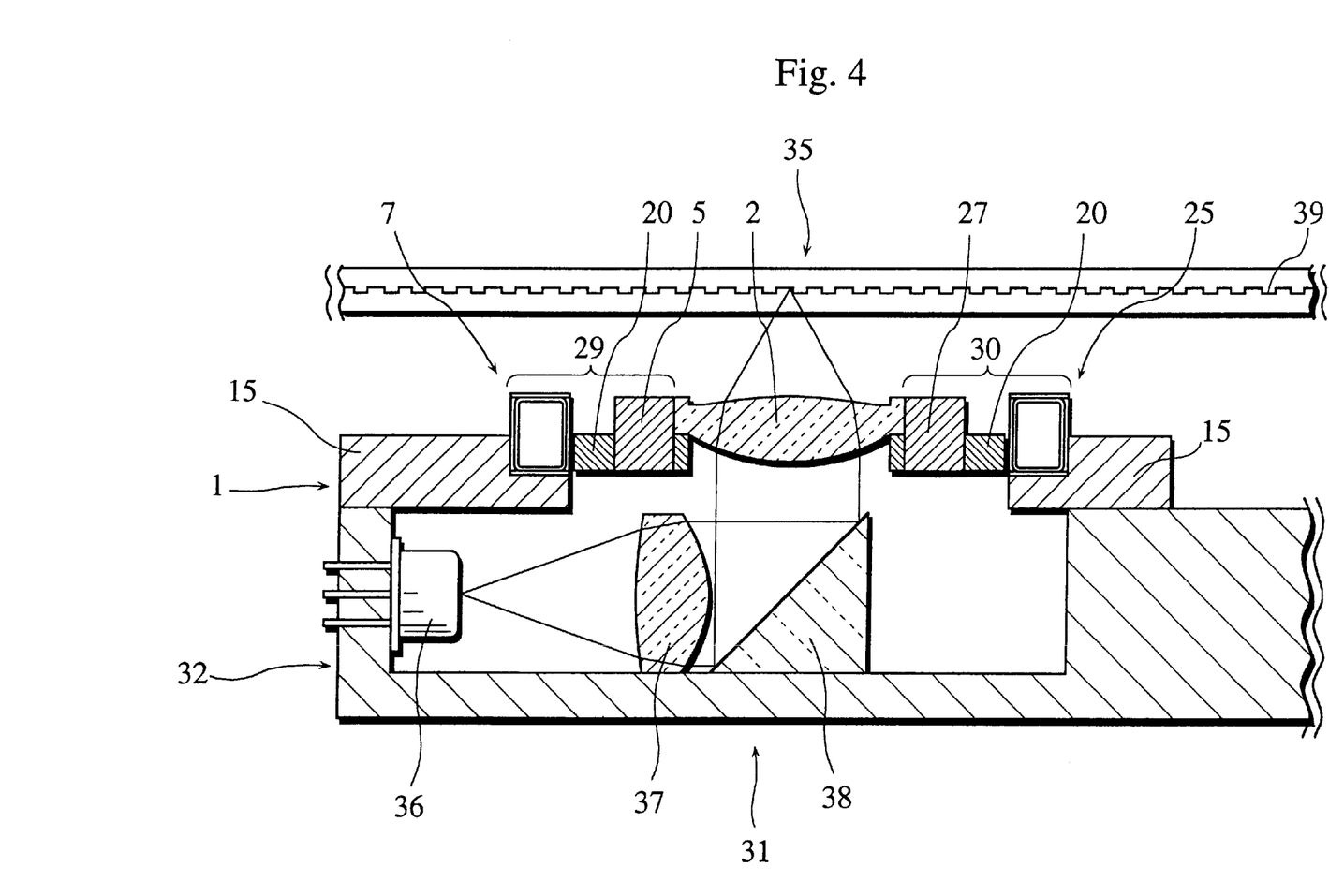
FIG. 4 is a vertical sectional view showing a construction of the main part of the optical pickup equipped with the lens driving device.

FIG. 4 is a vertical sectional view of the optical pickup 31 taken along a line A—A in FIG. 3. The drawing shows constructions of the lens driving device 1 and optical members set underneath the lens driving device 1. For the sake of simplicity, only the section is shown in the drawing, while the background is not shown. As shown in the drawing, at the end of the swinging arm 32, a concave is formed for containing optical components such as a semiconductor laser device 36, a collimating lens 37, and a raising mirror 38. The base 15 of the lens driving device 1 is fixed to the swinging arm 32 with an adhesive or similar to cover the concave.

The semiconductor laser device 36 is a well-known device which is integrated of a semiconductor laser component as a light-emitting component, a plurality of photoreceptors as signal detectors, and a hologram optical component as an optical branch component that divides incident light.

The optical components such as the semiconductor laser device 36, the collimating lens 37, and the raising mirror 38 are arranged in the following fashion. A laser beam emitted from the semiconductor laser device 36 is collimated by the collimating lens 37, and its optical path is changed by the raising mirror 38 so that the laser beam enters the lens 2 with its chief ray almost coincident with the optical axis of the lens 2.

After passing through the lens 2, the laser beam is condensed on a recording surface 39 of the optical disc 35, and reflected from the recording surface 39. The reflected beam regresses the optical path and returns to the semiconductor laser device 36. The reflected beam is divided by optical branch components (not illustrated) in the semiconductor laser device 36 and received by the photoreceptors. The photoreceptors generate a focusing error signal, a tracking error signal, and a data signal according to the amount of the light and output to an control device (not illustrated).

As described above, the recording surface 39 is displaced due to a precession, tilt, or the like of the optical disc 35. Accordingly, in order to read information recorded on the recording surface 39 properly, the focal point of the laser beam has to be followed the displacement. The control device moves the lens 2 in the focusing direction by exciting focusing coils 8 and 24 of the driving units 29 and 30 to have the focal point of the laser beam follow the displacement in the direction of the optical axis according to a focusing error signal generated by the semiconductor laser device 36.

In the same way, the optical path of the laser beam is followed to the displacement in the tracking direction by moving the lens 2 in the tracking direction according to a tracking error signal.

The lens 2 can be moved smoothly by the damping member 20 that holds the lens 2 because the damping member 20 can deform in any direction. Also, undesired oscillations of the lens 2 are suppressed by an oscillation suppressing effect brought by good absorbency of the material of the damping member 20, silicone porous material. Therefore, the accuracy of optical reading of the optical pickup 31 is extremely improved.

In addition, the linear elastic supporting member for holding the lens and the damping member for suppressing the oscillations of the elastic supporting member itself are needed in the lens driving devise disclosed in Japanese Laid-Open Patent Application No. H7-105551 (shown as a prior art), while the number of members is reduced in the lens driving devise of this embodiment because the lens 2 is held directly by the damping member 20. As a result, the size of the lens driving devise 1 becomes smaller.

Here, silicone porous material is not only viscoelastic in any direction but weather-resistant and durable, so that life of this lens driving device become longer than that of the lens driving device with a damping member made of any other material.

Also, the viscoelasticity of silicone porous material is easily changed by additives, so that the viscoelasticity of the damping member 20 can be changed depending on characteristics of the lens driving device 1 such as weight of the lens 2, the magnet 5, or 27.

In addition, silicone porous material gets other properties by adding additives. For example, by adding a thermal conductive filler, the damping member 20 gets thermal conductivity. When a member of the optical pickup 31, for example the lens 2, is heated by the laser beam, the damping member 20 transmits the heat of the lens 2 to other members, so that the lens driving device, as a whole, performs heatsink and cooling efficiently.

Here, the base 15 is a die-casting made of aluminum alloy, but it can be made of magnesium alloy or resin.

Second Embodiment

Figure 5:
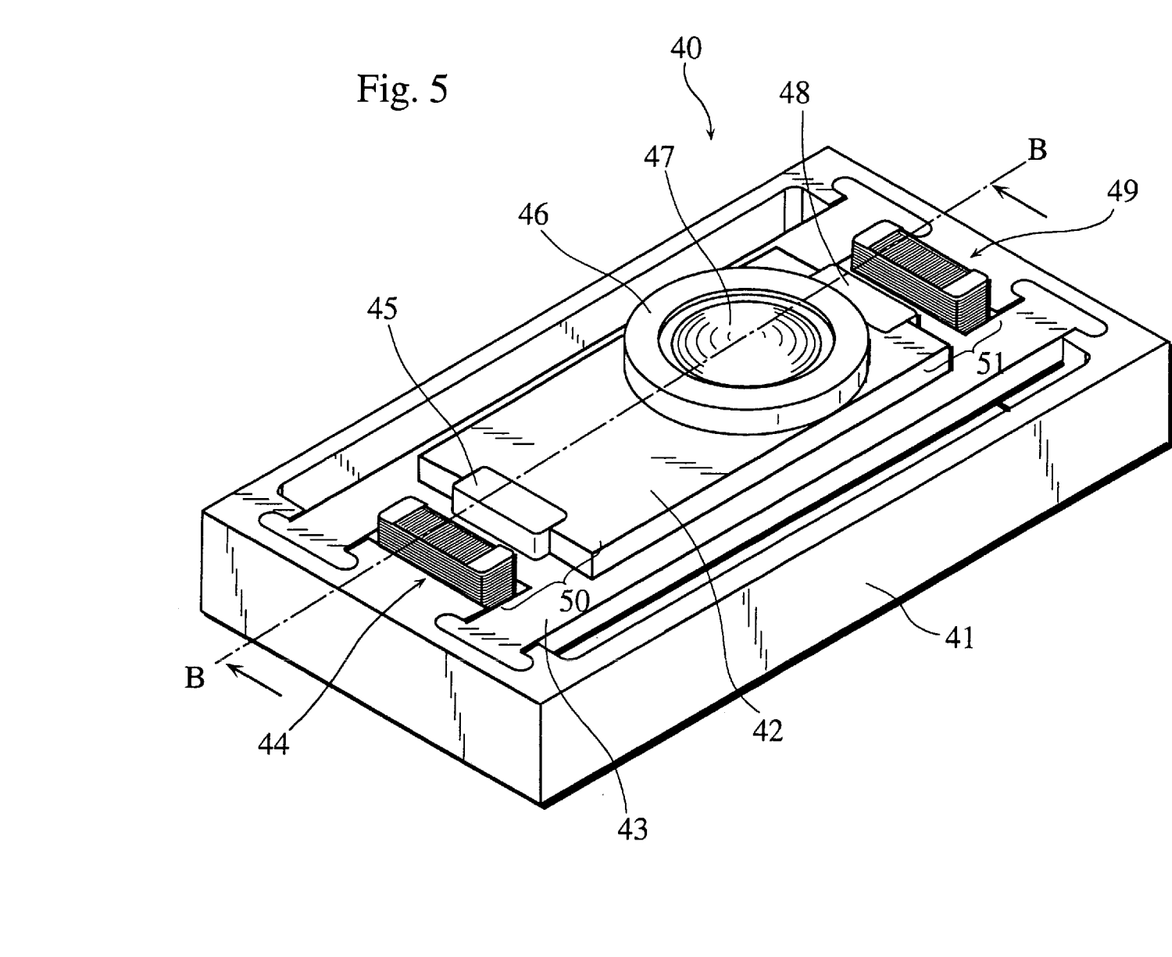
FIG. 5 is a perspective side view showing a construction of an optical pickup in the second embodiment of the present invention.

FIG. 5 is a perspective side view of an optical pickup 40 in the second embodiment of the present invention. A lens 47 is made of resin, and an outer edge 46 of the lens 47 is attached to steps 53 and 56 in a round-shaped opening, refer to FIG. 6, on the top face of a enclosure 42. The enclosure 42 is held via a damping member 43 made of silicone porous material by a framelike-shaped base 41.

A magnet 45 and 48 are attached to indentations at the both ends of the length of the enclosure 42. Driving coils 44 and 49 are fixed to the base 41 so as to face the magnets 45 and 48, respectively. A driving unit 50 includes the magnet 45 and the driving coil 44, and a driving unit 51 includes the magnet 48 and the driving coil 49. Like the driving coil 7 and 25 in FIG. 1, the driving coils 44 and 49 are roughly made up of focusing coils and tracking coils respectively wound around one and the same core in the directions that intersect each other at approximately right angles (90 degrees).

Figure 6:
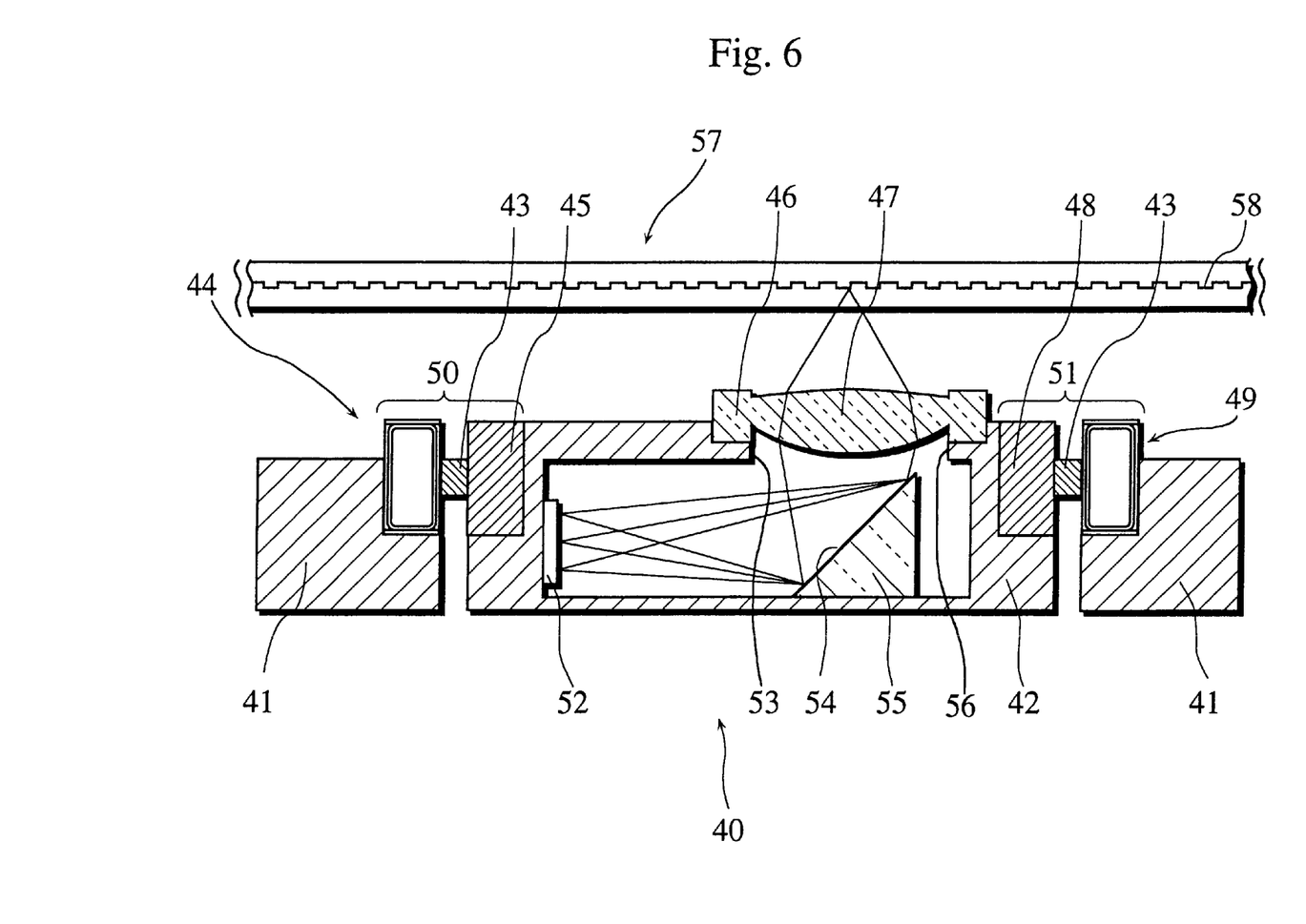
FIG. 6 is a vertical sectional view showing the construction of the optical pickup in the second embodiment.

FIG. 6 is a vertical sectional view of the optical pickup 40 taken along the line B—B shown in FIG. 5. As shown in the FIG. 6, an integrated light-emitting/receiving component 52 and a raising mirror 55 are contained in the enclosure 42. The integrated light-emitting/receiving component 52 is made by packing a light-emitting component and a plurality of photoreceptors. A semiconductor laser component is used as the light-emitting component. The raising mirror 55 has a reflecting hologram surface 54.

A laser beam emitted from the semiconductor laser component on the integrated light-emitting/receiving component 52 is reflected from the reflecting hologram surface 54 of the raising mirror 55 and condensed on a recording surface 58 of an optical disc 57 by the lens 47. The laser beam reflected from the recording surface 58 regresses on the optical path described above and is divided at the reflecting hologram surface 54 to enter the photoreceptors on the integrated light-emitting/receiving component 52.

According to outputs from each photoreceptor, a focusing error signal, a tracking error signal, and a data signal are generated. The explanation about how to generate these signals is omitted here because it is well-known.

When a focal point of the laser beam is displaced from the recording surface 58 in the focusing direction, the photoreceptors generate a focusing error signal. According to the focusing error signal, a current is passed through the focusing coils of the driving units 50 and 51, and the magnet 45 and 48 are moved in the focusing direction. As a result, the enclosure 42 containing the lens 47 is moved in the focusing direction, so that the focal point of the laser beam is adjusted. When a focal point of the laser beam is displaced from the recording surface 58 in the tracking direction, the focal point of the laser beam is adjusted in the same way.

This embodiment is different from the first embodiment in a point that optical members, namely the enclosure 42 itself containing the integrated light-emitting/receiving component 52 and the lens 47, are moved, so that the chief ray of the laser beam can be placed to coincide with the optical axis of the lens 47. As a result, optical characteristics are stably effective because the tracking error signal is not deteriorated in amplitude or offset even when the lens 47 is moved in the tracking direction.

Modifications

Although the present invention has been described according to the embodiments, it is to be noted that the present invention is not limited to the embodiments described above. The embodiments can be modified as followings.

(1) Electromagnetic actuators are classified into two types: MC Type (Moving Coil Type: a movable member has driving coils) and MM Type (Moving Magnet Type: amovable member has magnets).

Although the first and second embodiment described above are constructed using only MM Type actuators in which movable members have magnets, MC Type actuators also can be used. An advantage of MC Type actuators is that they are easily controlled because magnets are displaced on a proportional basis to a current passing through driving coils. On the other hand, MM Type actuators do not need wiring on the movable member. It is preferred that suitable type actuators are chosen depending on designs and/or purposes.

(2) Also, it is preferred that a recording surface of an optical disc intersects the optical axis of a lens at approximately right angles (90 degrees) in order to read the information on the optical disc properly. Some conventional lens driving devices generate a tilting error signal when detecting decentering of a recording surface. The following modification shows a lens driving device that changes tilt of the lens according to a tilting error signal(hereafter called "tilting driving").

Figure 7:
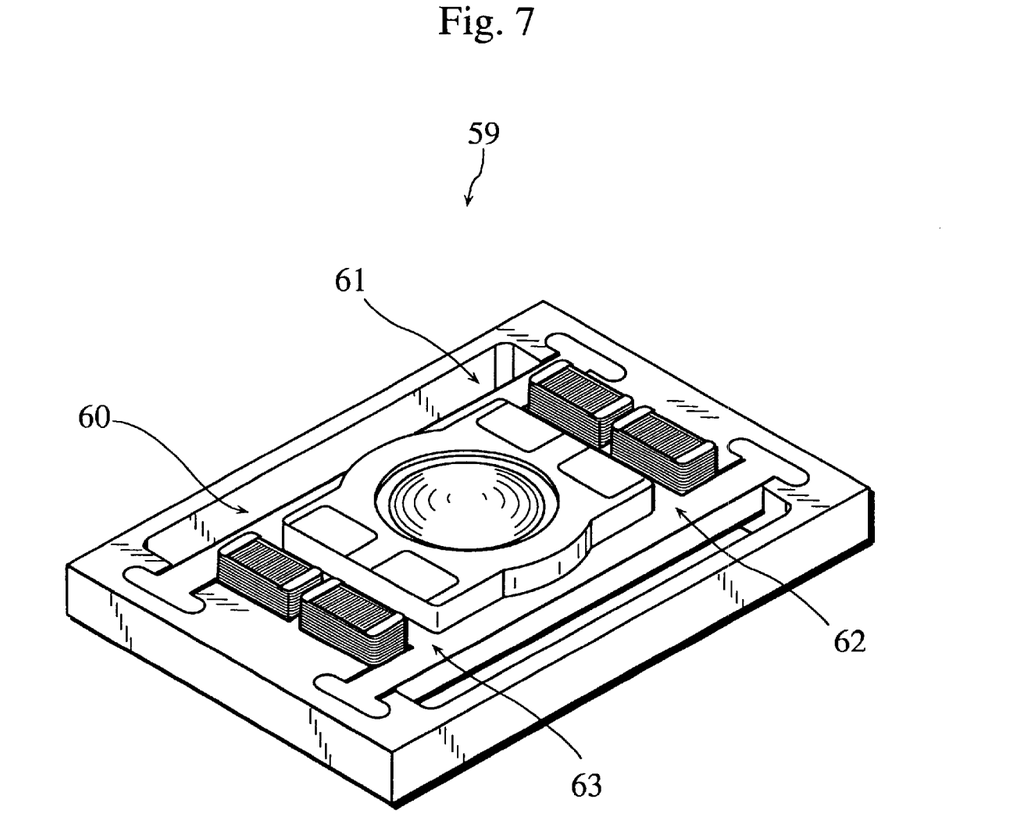
FIG. 7 is a perspective side view showing a construction of a modification to the lens driving device of the present invention.

The lens driving device in this modification has four driving units 60, 61, 62, and 63 as shown in FIG. 7 in which the driving units 60 and 63 are opposite to the driving units 61 and 62 in the longitudinal direction of the lens driving device with the lens interposed in between them.

In this construction, when a different amount of currents is passed through the focusing coils of the driving units 60 and 61 from the focusing coils of the driving units 62 and 63, in which two pairs are opposite to each other with the lens interposed in between them, torque is produced in the direction of rotating the lens on an axis that is parallel to the tracking direction, so that the lens driving device performs the tilt driving in the same direction. Also, in the same way, when a different amount of currents is passed through the focusing coils of the driving units 60, 63 from the focusing coils of the driving units 61 and 62, the lens performs the tilting driving on an axis that is parallel to the main surface of the damping member and intersects the tracking direction at approximately right angles (90 degrees). Accordingly, in this modification, the tilting driving can be performed on two axises that intersect each other at approximately right angles (90 degrees), so that the tilting driving can be performed in any direction. Therefore, the focal point of the laser beam can be followed to the track on the recording surface regardless of the direction of the tilt of the recording surface. This is effective to anticipate precession of a turntable of an optical disc.

Here, generally, when two pairs of driving units are arranged in the direction that intersects the driving direction at approximately right angles (90 degrees), and their driving directions are parallel to the optical axis of the lens, the tilting driving can be performed in any direction by adjusting driving forces of the driving units. Also, as described above, when they are arranged in the state of having lines passing across the optical axis of the lens between them, the tilting driving can be performed more efficiently.

(3) In the first and second embodiment, a light-emitting component and photoreceptors are combined, but they can be used in separate forms. In the case, the optical path of the returning light from the recording medium is led to the photoreceptors using a half mirror or a beam splitter.

Here, a component packed of a light-emitting/receiving component and another optical component also can be used effectively in this present invention. The first embodiment has an afocal construction in which the optical members include a collimating lens to follow the displacement of the lens, while the construction of the second embodiment is not afocal. However, in both embodiments, this present invention can be used effectively regardless of choosing either construction of them.

(4) In the embodiment described above, the base is moved by the swinging arm method, but a linear motor method or a traverse driving method using a coarse motor can be used instead.

Also, in the first embodiment, when the lens is made by molding resin, the magnet attached to the outer edge of the lens can be molded in the lens as a combination. Also, in the construction using MC Type actuators, the driving coils can be molded in the lens as a combination. In the second embodiment, when the base is made of resin, the magnets or the driving coils can be molded in the base.

As described above, when the magnet or the driving coils as the driving member is molded in the lens or the base as the movable member, the cost of the device reduces, and the characteristics of the lens driving device are shown stably with accuracy of positioning of the driving members.

(5) In the embodiment described above, the damping member 20 is made of silicone porous material, but other gel materials that are substantially made of silicone can be used instead. The molecular construction of silicone is changed by additives, so that it can be adjusted in vibration isolation or in shock absorbing. There are organic additives and inorganic additives; for vibration isolation, inorganic additives are used. In the embodiment described above, the silicone is porous, but adding certain additives, other types of silicone can be used effectively in the present invention.

An example product of the gel materials is a αGEL (GELTECH Co.Ltd.). αGEL is substantially made of silicone, and the penetration grade of it (Japanese Industrial Standards K2530-1976-50 g weight) is 50–200. In the range of 50–200, αGEL shows good properties of vibration isolation, shock-absorbing, and soundproofing. αGEL is so special in bridging and molecular construction that it is good in keeping and reproducing the shape. The key property of αGEL is being independent of temperature in vibration isolation, shock-absorbing, and soundproofing. αGEL shows the properties in wide range of temperature, while other materials show their properties only at ordinary temperatures. Also, αGEL stably shows the properties such as heat-resistance, cold-resistance, weather-resistance, and safety.

In addition, instead of silicone, rubber isolators such as urethane high dumping rubber, polynorbornene rubber, polyisobutyl rubber, natural: rubber, and EPDM rubber (Ethylen-Propylen-Dien-Monomer rubber) can be used for damping member 20.

As described above, the lens driving device in the present invention is held by the base via the viscoelastic damping member, and the damping member suppresses the oscillations of the lens in any direction through its vibration suppressing action. By using this lens driving device in order to move an lens of an optical pickup, the lens driving device prevents undesired oscillations of optical members, so that the optical pickup can read and write the information of an optical recording medium properly.

Here, because the lens is held directly by the base via the damping member, the size of the lens driving device become smaller than conventional lens driving devices that is held like a cantilever via a plurality of linear elastic supporting members.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A lens driving device, comprising:
    a lens;
    a base
    a damping member with fixed parts, the damping member includes a viscoelastic material which holds the lens in a state of being movable in relation to the base; and
    a driving means for driving the lens in a given direction, wherein the base has space for accommodating the damping member, and
    wherein the damping member is platelike in shape and is suspended in the space of the base, the fixed parts of the damping member are fixed to the base, the damping member has a main surface with an opening that passes through the damping member, and the lens is attached to the damping member in a state that an optical axis of the lens passes through the opening.

2. The lens driving device of claim 1 wherein the fixed parts being on both ends of the damping member in a longitudinal direction.

3. The lens device of claim 1, wherein the lens is attached to the damping member in a state that the optical axis of the lens is substantially perpendicular to the main surface of the damping member.

4. An optical pickup comprising:

a semiconductor laser component;

a lens for condensing a laser beam emitted from the semiconductor laser component on a recording surface of an optical recording medium;

a base;

a damping member that is made of a material which is viscoelastic and holds the lens in a state of being movable in relation to the base, wherein the base has space for accommodating the damping member, and wherein the damping member is platelike and suspended in the space in a state that fixed parts of the damping member are fixed to the base, wherein, on a main surface, the damping member has an opening that passes through the damping member, and the lens is attached to the damping member in a state that an optical axis of the lens passes the opening;

a lens driving means for driving the lens in a given direction; and photoreceptors that receive a returning laser beam from the optical recording medium.

5. The optical pickup of claim 4, wherein the fixed parts being on both ends of the damping member in a longitudinal direction.

6. The optical pickup of claim 4, wherein the lens is attached to the damping member in a state that the optical axis of the lens is substantially perpendicular to the main surface of the damping member.

7. An optical pickup comprising:

a semiconductor laser component;

a lens for condensing a laser beam emitted from the semiconductor laser component on a recording surface of an optical recording medium;

photoreceptors that receive a returning laser beam from the optical recording medium;

an enclosure that holds the lens and contains the semiconductor laser component and photoreceptors arranged in a state of having a predetermined positional relationship;

a base;

a damping member that is made of a material which is a viscoelastic and holds the enclosure in a state of being movable in relation to the base;

wherein the base has space for accommodating the damping member, the damping member is platelike and suspended in the space in a state that fixed parts of the damping member are fixed to the base, and wherein, on a main surface, the damping member has an opening that passes through the damping member, and the lens is attached to the damping member in a state that an optical axis of the lens passes the opening; and a driving means for driving the enclosure in a given direction.

8. The optical pickup of claim 7, wherein the fixed parts being on both ends of the damping member in a longitudinal direction.

9. The optical pickup of claim 7, wherein the lens is attached to the damping member in a state that the optical axis of the lens is substantially perpendicular to the main surface of the damping member.

* * * * *